(12) United States Patent  (10) Patent No.: US 9,005,493 B2
Hsu  (45) Date of Patent: Apr. 14, 2015

(54) METHOD AND APPARATUS FOR MAKING RETARDER IN STEREOSCOPIC GLASSES

(76) Inventor: Roger Wen-Yi Hsu, Rancho Cucamonga, CA (US)

(*) Notice: Subject to any disclaimer, the term of this patent is extended or adjusted under 35 U.S.C. 154(b) by 1034 days.

(21) Appl. No.: 13/024,291

(22) Filed: Feb. 9, 2011

(65) Prior Publication Data

US 2011/0194179 A1 Aug. 11, 2011

Related U.S. Application Data

(60) Provisional application No. 61/302,553, filed on Feb. 9, 2010, provisional application No. 61/313,598, filed on Mar. 12, 2010, provisional application No. 61/327,410, filed on Apr. 23, 2010, provisional application No. 61/334,856, filed on May 14, 2010.

(51) Int. Cl.
*B29D 11/00* (2006.01)
*B29C 65/00* (2006.01)
*B29C 65/48* (2006.01)
*B29C 65/70* (2006.01)
*G02B 5/30* (2006.01)
*G02B 27/26* (2006.01)
*G02B 27/22* (2006.01)

(52) U.S. Cl.
CPC ........ *B29D 11/00634* (2013.01); *G02B 5/3083* (2013.01); *G02B 27/26* (2013.01)

(58) Field of Classification Search
None
See application file for complete search history.

(56) References Cited

U.S. PATENT DOCUMENTS

| | | | |
|---|---|---|---|
| 2,612,079 A | 9/1952 | Mahler | |
| 2,745,138 A * | 5/1956 | Beattie | 249/82 |
| 4,111,695 A | 9/1978 | Yevick | |
| 4,129,628 A * | 12/1978 | Tamutus | 264/2.5 |
| 4,160,799 A | 7/1979 | Locey | |
| 4,238,443 A | 12/1980 | Levy | |
| 4,508,526 A | 4/1985 | Dutcher | |
| 4,608,105 A | 8/1986 | Alger | |
| 5,061,042 A | 10/1991 | Nakamura | |
| 5,113,285 A | 5/1992 | Franklin | |
| 5,245,456 A | 9/1993 | Yoshimi | |
| 5,285,303 A | 2/1994 | Okada | |
| 5,355,183 A | 10/1994 | Andrea | |
| 5,366,682 A | 11/1994 | Morikawa | |
| 5,385,465 A * | 1/1995 | Greiwe et al. | 425/308 |
| 5,472,538 A | 12/1995 | Minakuchi | |
| 5,821,989 A | 10/1998 | Lazzaro | |
| 5,888,634 A | 3/1999 | Shimizu | |
| 5,999,240 A | 12/1999 | Sharp | |
| 6,002,518 A | 12/1999 | Faris | |
| 6,219,121 B1 | 4/2001 | Sahouani | |
| 6,330,108 B1 | 12/2001 | Nishikouji | |
| 6,498,679 B2 | 12/2002 | Lee | |
| 6,542,300 B2 | 4/2003 | Umemoto | |
| 6,613,243 B2 | 9/2003 | Ricks | |
| 6,751,023 B2 | 6/2004 | Umemoto | |

(Continued)

*Primary Examiner* — Jeffrey Wollschlager
(74) *Attorney, Agent, or Firm* — Alexander Chen, Esq.

(57) ABSTRACT

A 3-d stereoscopic viewing lens which the retarder film is made of a PVA film. A 3-D stereoscopic viewing lens having a linear polarized film, one or more lens substrate layers, and an epoxy layer. A process of making retarder film including mounting a PVA film to an assembly line; wetting, cleaning, and washing the PVA film through said assembly line; softening, expanding and stretching the PVA film's x-axis through said assembly line; adding gap filling agent to the PVA film; stretching the PVA film's y-axis through a width frame holder and as a result transforming the PVA film into a retarder film.

13 Claims, 19 Drawing Sheets

(56) References Cited

U.S. PATENT DOCUMENTS

| | | |
|---|---|---|
| 6,786,599 B2 | 9/2004 | Hayashi |
| 6,807,006 B2 | 10/2004 | Nakagoshi |
| 6,819,431 B2 | 11/2004 | Carlson |
| 7,099,083 B2 | 8/2006 | Johnson |
| 7,105,586 B2 | 9/2006 | Verrall |
| 7,106,509 B2 | 9/2006 | Sharp |
| 7,169,447 B2 | 1/2007 | Su Yu |
| RE39,605 E | 5/2007 | Verrall |
| 7,221,510 B2 | 5/2007 | Mizushima |
| 7,251,075 B2 | 7/2007 | Trapani |
| 7,320,515 B2 | 1/2008 | Lin |
| 7,339,736 B2 | 3/2008 | Trapani |
| 7,354,632 B2 | 4/2008 | Murakami |
| 7,381,507 B2 | 6/2008 | Kwok |
| 7,473,446 B2 | 1/2009 | Ito |
| 7,515,231 B2 | 4/2009 | Hale |
| 7,517,081 B2 | 4/2009 | Lipton |
| 7,524,053 B2 | 4/2009 | Lipton |
| 7,528,906 B2 | 5/2009 | Robinson |
| 7,662,456 B2 | 2/2010 | Bell |
| 2004/0065967 A1* | 4/2004 | Tanaka ........................ 264/1.34 |
| 2004/0212885 A1 | 10/2004 | Mizushima et al. |
| 2006/0285026 A1 | 12/2006 | Robinson |
| 2007/0146887 A1* | 6/2007 | Ikeda et al. .................. 359/586 |
| 2007/0207277 A1* | 9/2007 | Mizushima et al. ......... 428/1.31 |
| 2007/0258141 A1* | 11/2007 | Ohgaru et al. ................ 359/485 |
| 2008/0062259 A1 | 3/2008 | Lipton |
| 2008/0193701 A1* | 8/2008 | Takayanagi et al. ......... 428/64.4 |
| 2008/0278807 A1 | 11/2008 | Richards |
| 2009/0092771 A1 | 4/2009 | Sasata |
| 2009/0097117 A1 | 4/2009 | Coleman |
| 2009/0174940 A1* | 7/2009 | Johnson et al. ............... 359/485 |
| 2009/0323185 A1* | 12/2009 | Goto et al. .................... 359/500 |

* cited by examiner

METHOD AND APPARATUS FOR MAKING RETARDER IN STEREOSCOPIC GLASSES

CROSS REFERENCE TO RELATED APPLICATIONS

This application claims the benefit of U.S. provisional application Ser. No. 61/302,553 filed on Feb. 9 2010, U.S. provisional application Ser. No. 61/313,598 filed on Mar. 12 2010, U.S. provisional application Ser. No. 61/327,410 filed on Apr. 23 2010, U.S. provisional application Ser. No. 61/334,856 filed on May 14 2010, the disclosures of which are incorporated herein by reference.

FIELD OF THE INVENTION

The present invention entails a novel process of forming a curved lens for improved 3-D perception of stereoscopic motion pictures, whereby the curved lens shape is formed involving a continuous stretch process of making the retarder film to prevent distortion and defects due to forming the retarder in curved form. The novel method allows for thinner stretching of PVA (organic polyvinyl alcohol) and polymer to perfect the curve shape for better matching between the lens and the user's eyes. Other improvements include the ability for retarder optical device to be laminated to the linear or circular polarizer without need for an extra polymer sheet, thereby improving light transmission for 3-D stereoscopic viewing, and for production of various specific thicknesses of the retarder film to enhance viewing contrast.

BACKGROUND OF THE INVENTION

Stereoscopy, or three dimensional imaging, relates to any technique that records three dimensional visual information and creates an illusion of enhanced depth in a user's perceived image. Traditional two dimensional images utilize human visual cues of occlusion of one object by another, convergence of parallel edges, change in size of textured patterns, haze, desaturation, shift to bluishness, and subtended visual angle. Stereoscopy enhances the illusion of depth in motion pictures, photographs, and other two dimensional images by presenting slightly different images to each eye, and thereby adding the human visual cue of stereopsis.

Glasses for viewing three dimensional images exist in two categories: active and passive. Among active 3-D glasses are liquid crystal shutter glasses and display glasses. Liquid crystal shutter glasses contain liquid crystal that blocks or passes light through synchronization with images on a computer display, using alternate frame sequencing. Stereoscopic head-mounted displays include one display per eye, which display a different perspective near each eye, and are not used in conjunction with an external screen to be viewed at distance. Examples of active 3-D glasses include Active shutter glasses lens controlled by infrared (IR), radio frequency (RF), DLP-LINK®, BLUE-TOOTH® TRANSMITTER which use electronic component to receive signal from emitter connected to display to activate a light shutter with the frequency of 120 Hertz or 240 Hertz or more.

Passive 3-D glasses include linearly-polarized glasses, cicularly-polarized glasses, infitec glasses, complementary color analyphs, chromadepth method glasses, anachrome compatible color analyph glasses, and red-eye shutter glasses where the most prevalent would be linearly-polarized glasses and circularly-polarized glasses. Linearly polarized glasses are used when a stereoscopic motion picture is projected and superimposed on the same screen through orthogonal polarizing filters. The viewer wears glasses containing orthogonal polarizing filters, which only pass through similarly polarized light and block orthogonally polarized light, allowing the viewer to only see one of the images in each eye to achieve a 3-D effect. Viewers must keep their heads level in order to prevent bleeding of images from the left and right channels into the opposite channel.

Circularly polarized glasses are used in circumstances where two images are projected superimposed onto a screen through circular polarizing filters of opposite handedness. The user wears eyeglasses which contain a pair of circular polarizing filters mounted in reverse, whereby light that is left-circularly polarized is extinguished by the right-handed analyzer and light that is right-circularly polarized is extinguished by the left-handed analyzer. This allows the user to tilt his head while viewing stereoscopic images and still maintain left and right separation.

Passive linear lenses exploit the wavelength difference between blue and red color lenses to create a 3-D effect. However, this method results in a perceived image that deviates from the actual color of the object.

Circularly polarized glasses have the advantage over linear polarized glasses because viewers with circularly polarized glasses may tilt their heads and look about without a disturbing loss of 3-D perception, whereas viewers using linear polarized glasses must keep their heads aligned within a narrow range of tilt for effective 3-D perception, or risk seeing double or darkened images.

Passive circularly polarized lenses in the market currently use flat lenses, which do not match the user's eyeball curvature and cause eye fatigue and discomfort. In addition, 3D effects is distorted if the viewers tilts their head beyond a certain angle from direct viewing of the screen. Despite the apparent short falls of the flat lens design, current market continues to utilize flat lens approach because distortion would result from curving the flat lens after molding and cutting the lens to suit the eye curvature. Specifically, this is caused primarily due to the fact that such method would rearrange the molecules in the film and degrade visual clarity.

As for active 3-D technology, the active shutter glass lens needs to be in a dark room in order to realize better resolution and full stereoscopic sensation. Some people like this but some will feel uncomfortable as well as their eyes and brain will get tired in a longer period time over than 2 hours. Moreover, although active shutter glass lens has high resolution, the flat shape of frame and heavier than usual weight cause increased eye strain, eye pressure, and induce nausea and headache when wore over long periods of time. Further, due to the flat lens shape, such lenses do not match the natural curvature of the eye. Due to the flashing of stereoscopic images at 120 Hertz or more, it tends to cause greater eye discomfort without a lens curvature. Thus, this invention also aims to create curvature lens for active 3D glasses.

Taken as a whole, current construction of flat lens, both active and passive, limits the frame shape and design. Even when we try to use flat sheet laminated to cut shape and with heating to bend; it reduces the resolution of viewing, and lead to discomfort in eyes and brain. Thus, the present invention solves the problem by continuously stretching the polarized lens and forming the lens into curved shape.

Further, a retarder is an optical device that alters the polarization state of a light wave traveling through it. The new method of processing the retarder with new laminate technology improves the 3-D stereoscopic image. The linear polarized film or partially circular polarized film is glued to the retarder inside the retarder include gap filling agent. The epoxy liquid is laminated outside the retarder then cured with air or UV light to create a "3-D circular polarized function card". The new function card will have a better birefrigent effect without extra polymer sheets, thus improving transmission. Currently state of the art allows for 60-85% transmission. Also current market uses polymer sheets to support the linear polarizer. The use of polymer sheet requires moist glue, which interferes with transmission. This support must be assembled using half-dry glue on the lens, which negatively affects lens clarity. Dry glue cannot be used in this assembly due to the limiting nature of the thick polymer retarder and linear polarizer.

In our invention, the thinness of the retarder and PVA film (polarizer) allows the application of almost crystallized lamination possible. Specifically, the present invention solves this problem through a process by which a thin retarder and PVA or circular polarizer may be produced and assembled with dry glue. This process allows the wearer to view stereoscopic images for a longer time period without discomfort. The process entails application of organic polyvinyl alcohol (PVA) or any selection among polymer polyurethane (PU), polyvinyl chloride (PVC), polypropylene (PP), polycarbonate (PC), or polyester (PE) as the ingredient to create retarder film with linear or partially circular polarization on different surfaces, such as flat and curved sheets, as a substantial improvement to current flat 3-D lenses and to end user viewing comfort. Other advantages of these methods versus previous methods include making distortion-free, thinner, flexible, functional, comparable, durable, optimal-performance circular polarized 3D lens. This innovative method allows for conformation of the lens shape onto a flat and curved surface when the lens is still malleable and moist rather than cutting the lens from a flat sheet of polymer.

OBJECT OF THE INVENTION

The purpose of present invention is to apply high quality retarder film to create full color, and virtually high resolution passive circular polarized 3D lens for aesthetical and comfortable eyewear to view stereoscopic images. Other advantages of these method versus previous methods include making distortion-free, thinner, flexible, functional, comparable, durable, optimal-performance circular polarized 3D lens. This innovative method allows production of forming lens shape into a flat and curved surface when the lens is still malleable and moist rather than cutting the lens from a flat sheet of polymer.

Objective of the present invention include production of high quality retarder film and application of said film to passive circularly polarized 3-D lenses in order to create aesthetically pleasing and highly comfortable eyewear to view stereoscopic images in accurate and brilliant color and full resolution.

Another objective of this invention is to produce distortion-free, thinner, more flexible and durable, and visually-optimized circularly-polarized 3-D lenses through the novel process of forming curved lens surfaces during the malleable or moist lens production phase, as opposed to cutting the lens from a flat polymer sheet, which causes optical distortion and end user discomfort.

SUMMARY OF THE INVENTION

One aspect of the invention includes a 3-D stereoscopic viewing lens comprising a retarder film wherein the retarder film is comprised of a PVA film. In one embodiment, the 3-D stereoscopic viewing lens further comprising a linear polarized film, one or more lens substrate layers, an epoxy layer. In another embodiment, the 3-D stereoscopic viewing lens is has a shape of a curvature. In another embodiment, the 3-D stereoscopic viewing lens further comprising a linear polarized film, a LCD layer, an ITO layer, a glass layer and a lens substrate layer In another embodiment, the retarder film is made comprising the following steps: mounting a PVA film to an assembly line; wetting, cleaning, and washing the PVA film through the assembly line; softening, expanding and stretching the PVA film's x-axis through the assembly line; adding gap filling agent to the PVA film; stretching the PVA film's y-axis through a width frame holder whereby transforming the PVA film into a retarder film. In another embodiment, the retarder film is made further comprising the following steps: mounting the retarder film onto a multiple holding frame; pressing a convex mold onto the retarder film to force the retarder film into a desired curved shape through one or more openings of the multiple holding frame; heating the retarder film to reduce the retarder film's moisture content; drying the retarder film.

In yet another embodiment, water is used in the process of wetting, cleaning and washing. In another embodiment, the processing of wetting, cleaning and washing is continued until the PVA film reaches approximately 70%-85% water saturation. In another embodiment, the processing of softening, expanding and stretching is carried out by one or more rollers mounted in the assembly line. In another embodiment, the gap filling agent is comprised on of potassium iodide, sodium iodide, copper (I) iodide, boric acid, and sodium tetra borate decahedra. In another embodiment, the gap filling agent is added during the processing of softening, expanding and stretching the PVA film. In another embodiment, the gap filling agent is added during the processing of softening, expanding and stretching the PVA film.

In another embodiment, the retarder film is stretched to about 3 to 6 times its original size along its x-axis. In another embodiment, the retarder film's width is reduced to about one half of its original width. In another embodiment, the retarder film's thickness is reduced to 0.02-0.12 mm thick.

In yet another embodiment, the retarder film is heated to about 60° C. to 80° C. wherein the process of heating is continued until the retarder film's moisture content is reduced to about 50%; In another embodiment, the process of drying takes place in a environment at approximately 25° C. and at 40-50% humidity until the retarder film's moisture content is reduced to about 40%.

In another aspect of the invention, method of making a 3-D stereoscopic viewing lens comprising the following steps: mounting a PVA film to an assembly line; wetting, cleaning, and washing the PVA film through the assembly line; softening, expanding and stretching the PVA film's x-axis through the assembly line; adding gap filling agent to the PVA film; stretching the PVA film's y-axis through a width frame holder whereby transforming the PVA film into a retarder film; mounting the retarder film onto a multiple holding frame; pressing a convex mold onto the retarder film to force the retarder film into a desired curved shape through one or more openings of the multiple holding frame; heating the retarder film to reduce the retarder film's moisture content; drying the retarder film. In another embodiment, the method further includes preparing a concave mold and a convex mold; adding epoxy onto the concave mold; affixing the retarder film onto the convex mold; positioning the retarder film with convex mold wherein the retarder film with convex mold is pressed down onto the epoxy with concave mold; compressing the convex mold with the concave mold; applying UV treatment to the convex mold and the concave mold; opening the convex mold and the concave mold; affixing a linear polarized film to the convex mold; adding UV glue to the retarder film; pressing the convex mold having the linear polarized film to the concave mold having the retarder film with UV glue; applying UV dry treatment to the concave mold and the convex mold whereby the retarder film laminates with the linear polarized film to form circular polarized film; removing the convex mold from the concave mold; applying UV glue to the circular polarized film; affixing lens substrate to the convex mold; compress the convex mold having the lens substrate with the concave mold having the circular polarized film to form a 3-D stereoscopic viewing lens; applying UV treatment to the convex mold and the concave mold; remove the 3-D stereoscopic viewing lens from the convex mold and the concave mold. In another embodiment, the lens substrate is selected from a group consisting of AC, CR, PU, TAC, and GLASS.

In another aspect of the invention, a retarder for a 3-D stereoscopic viewing lens wherein the retarder film is comprised of a PVA film is disclosed. In another embodiment, the retarder film is made comprising the following steps: mounting a PVA film to an assembly line; wetting, cleaning, and washing the PVA film through the assembly line; softening, expanding and stretching the PVA film's x-axis through the assembly line; adding gap filling agent to the PVA film; stretching the PVA film's y-axis through a width frame holder whereby transforming the PVA film into a retarder film; mounting the retarder film onto a multiple holding frame; pressing a convex mold onto the retarder film to force the retarder film into a desired curved shape through one or more openings of the multiple holding frame; heating the retarder film to reduce the retarder film's moisture content; drying the retarder film.

In another aspect of the invention, a 3-D stereoscopic viewing lens comprising a retarder film wherein the retarder film is comprised of a polymer film selected from a group consisting of PU, PVC, PP, PC, NYLON, PE, CAB, CP, DAC and TAC film is disclosed. In another embodiment, the retarder film is made comprising the following steps: keeping a polymer film in a proper temperature at over 90° C.-120° C. until the polymer is malleable; mounting the polymer film to an assembly line; softening, expanding and stretching the polymer film's x-axis through the assembly line; stretching the polymer film's y-axis through a width frame holder whereby transforming the polymer film into a retarder film.

In yet another aspect of the invention, a 3-D stereoscopic viewing lens comprising the following steps is disclosed: providing polymer film selected from a group consisting of PU, PVC, PP, PC, NYLON, PE, CAB, CP, DAC and TAC film; keeping the polymer film in a proper temperature at over 90° C.-120° C. until the polymer is malleable; mounting the polymer film to an assembly line; softening, expanding and stretching the polymer film's x-axis through the assembly line; stretching the polymer film's y-axis through a width frame holder whereby transforming the polymer film into a retarder film; mount the retarder film onto a multiple holding frame; pressing a convex mold onto the polymer film to force the retarder film into a desired curved shape through one or more openings of the multiple holding frame; preparing a concave mold and a convex mold; adding epoxy onto the concave mold; affixing the retarder film onto the convex mold; positioning the retarder film with convex mold wherein the retarder film with convex mold is pressed down onto the epoxy with concave mold; compressing the convex mold with the concave mold; applying UV treatment to the convex mold and the concave mold; opening the convex mold and the concave mold; affixing a linear polarized film to the convex mold; adding UV glue to the retarder film; pressing the convex mold having the linear polarized film to the concave mold having the polymer film with UV glue; applying UV dry treatment to the concave mold and the convex mold whereby the retarder film laminates with the linear polarized film to form a circular polarized film; removing the convex mold from the concave mold; applying UV glue to the circular polarized film; affixing lens substrate to the convex mold; compress the convex mold having the lens substrate with the concave mold having the circular polarized film to form a 3-D stereoscopic viewing lens; applying UV treatment to the convex mold and the concave mold; removing the 3-D stereoscopic viewing lens from the convex mold and the concave mold.

In yet another aspect of the invention, the making of a 3-D stereoscopic view lens further includes the following steps: preparing a concave mold and a convex mold; adding liquid glass onto the concave mold to form a glass substrate layer; apply glue to the glass substrate layer; affixing the retarder film onto the convex mold; positioning the retarder film with convex mold wherein the retarder film with convex mold is pressed down onto the glass substrate layer with concave mold; compressing the convex mold with the concave mold; applying UV treatment to the convex mold and the concave mold; opening the convex mold and the concave mold; affixing a linear polarized film to the convex mold; adding UV glue to the retarder film; pressing the convex mold having the linear polarized film to the concave mold having the retarder film with UV glue; applying UV dry treatment to the concave mold and the convex mold whereby the retarder film laminates with the linear polarized film to form circular polarized film; removing the convex mold from the concave mold; applying UV glue to the circular polarized film; affixing lens substrate to the convex mold; compress the convex mold having the lens substrate with the concave mold having the circular polarized film to form a 3-D stereoscopic viewing lens; applying UV treatment to the convex mold and the concave mold; remove the 3-D stereoscopic viewing lens from the convex mold and the concave mold.

In yet another aspect of the invention, the making of a 3-D stereoscopic view lens further includes the following steps: adding a glass substrate layer to a concave mold; vacuum coating the glass substrate layer with an ITO layer; adding a LCD layer to the ITO layer; affixing s lens substrate layer to a convex mold; adjoin the lens substrate layer with the retarder film; compressing the convex mold with the concave mold whereby the retarder film adjoins with the LCD layer to form a 3-D stereoscopic viewing lens; applying UV treatment; removing the convex mold from the concave mold.

DETAILED DESCRIPTION OF THE EMBODIMENTS

The present invention discloses the making of the retarder film using the continuous stretching process to conform to the lens shape. It can reduce the distortion and defect of forming the retarder film. Specifically, the present invention provides method where it can stretch PVA (using a wetting process), and form it into curve shape and to become a retarder. The thinness of the film, using a wetting process, and proper temperature of polymer makes the polymer fit the shape of mold in perfect match. That is excellent for retarder to form most shape and curve. The new invention can apply to 3-D glasses, advertisement panel, tail light, lamp, especially curved shape.

In addition, gap filling agent was added to the water tank in the assembly line process to fill almost all the gaps of molecule in PVA film to create a birefrigent film, flat or any shape of retarder film. While the curved lens has better 3D effect than flat lens, the new invention further provides method for improving the effect of flat lens because the molecules of PVA or polymer (PU, PVC, PP, PC, NYLON, PE, CAB, CP, DAC and TAC film) are arranged in order.

New method to process retarder with new laminate technology improves the 3D stereoscopic image. The linear polarized film is glued to the retarder film wherein inside the retarder film has inclusion of gap filling agent. The epoxy liquid was laminated to the outside of the retarder film then cured with air or UV light to create an effective "3-D CIRCULAR POLARIZED FUNCTION CARD". The new function card will have better birefrigent effect without extra polymer sheet, thus improve the transmission. Other invention includes wherein the past, the use of multiple polymer sheets to support linear polarizer requires the use of moist glue for the polymer sheet to be glued to the linear polarizer. The moisture of the glue often interferes with transmission of light. In the present invention, because the thinness of the PVA film, it makes the application of lamination of PVA film with linear polarizer possible for crystallized lamination.

Present invention can reduce the use of either the retarder, linear polarized film materials to half of what the market is currently commanding, primarily due to the use of the application of epoxy to form support.

The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. The present invention is a retarder film and a method of making retarder. The major steps in producing the retarder and a 3-D stereoscopic viewing lens are described in the following sections.

EXAMPLE ONE

I. Preparation of PVA Film for Use to Form Retarder Film

Figure 1:
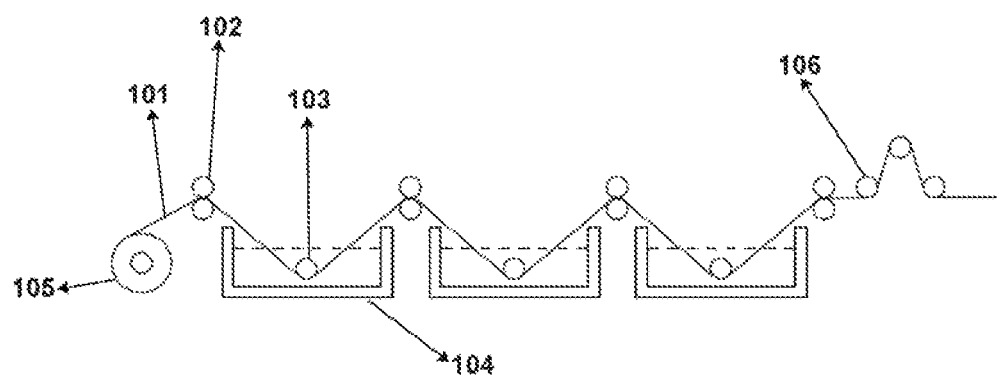
FIG. 1 depicts an embodiment of stretching of the retarder film.

FIG. 1 depicts one embodiment of an assembly line to prepare a retarder film. Specifically, FIG. 1 depicts the process of continuous stretch of the PVA film along its X-axis. Starting with an untreated roll of PVA film, without directional molecular arrangement. Using rollers to stretch and transport PVA film from one or more stages as follows:

a. mount an untreated roll of PVA film 101 at the beginning of assembly line 105;

b. use water to in processing tank 104 to wet, clean, and wash the film 101 until it has approximately 70%-85% water saturation;

c. softening, expanding and stretching the film as the film 101 continues to be stretched through roller 102, roller 103 and roller 106.

In the stretching process gap filling agent (mixture of potassium iodide, sodium iodide, copper (I) iodide, boric acid, and sodium tetra borate decahedra) was added to the processing tank 104 to form an improved PVA film. The addition of the gap filling agent is used to fill the pores of the molecules to have birefringent effect. PVA film is stretched to about 3 to 6 times its original size along the x-axis, combining stretch, its width is reduced to about one half of its original widths, and its thickness is reduced to 0.12-0.02 mm thick. The molecules of the PVA film will become more evenly aligned.

Figure 2:
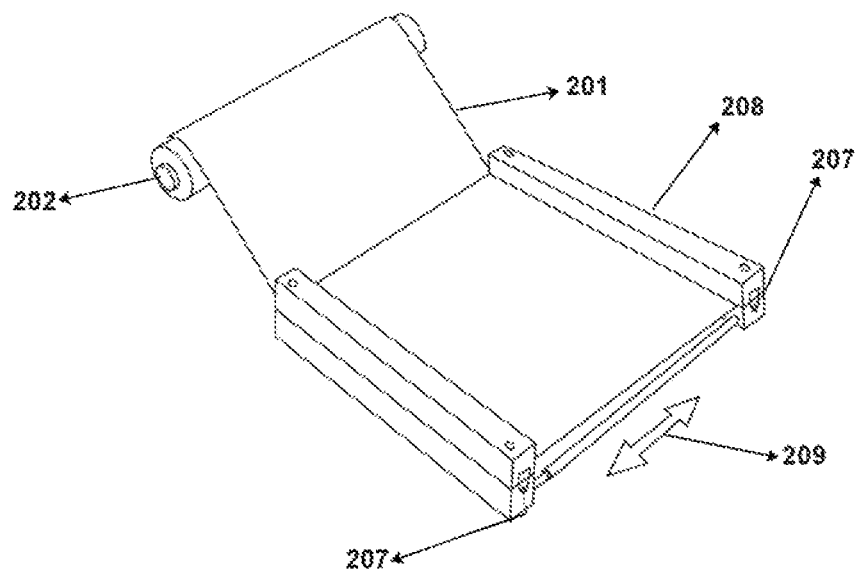
FIG. 2 depicts an embodiment of the adjustable width holding frame.
Figure 3:
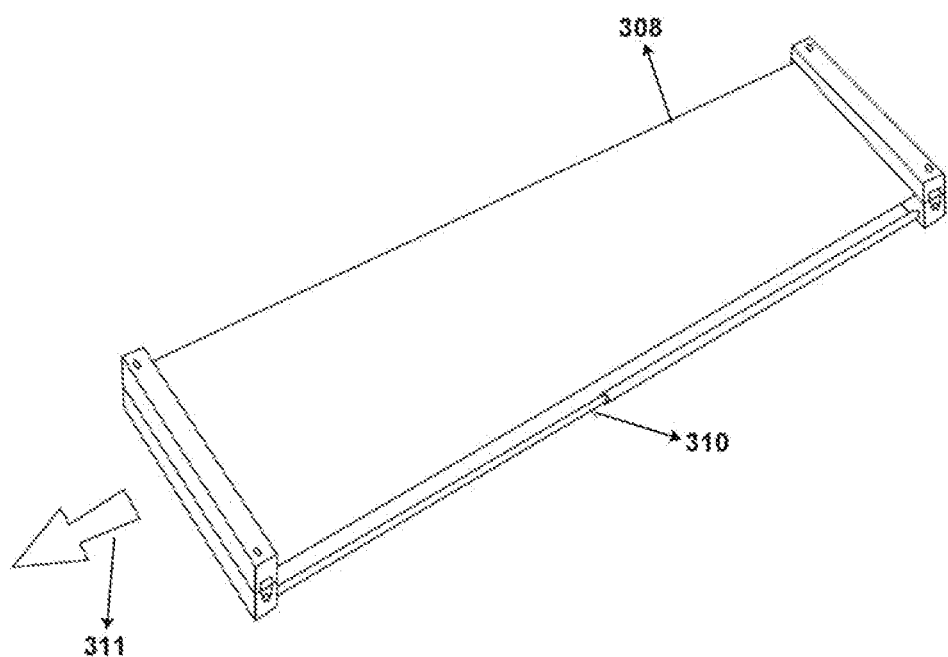
FIG. 3 depicts an embodiment of an adjustable holding frame.

II. Forming the Retarder Film of Example One and Forming it into the Desired Curved Shape Using a Convex Mold FIG. 2 and FIG. 3 depict one embodiment of a manual and semi-automatic or automatic adjustable clamping frame used for the next step of transforming the PVA film into a retarder film. Specifically, after steps performed in FIG. 1, FIG. 2 depicts one embodiment of a width-adjustable holding frame 208 to hold the PVA film along the Y-axis 209 using a top and bottom clamping frames together with hinges 207. Specifically, the width frame holder has an upper frame and a lower frame wherein the upper frame closes onto the lower frame whereby securing the PVA film wherein then the width frame holder extends along y-axis of the PVA film whereby transforming said PVA film into a retarder film; FIG. 3 depicts one embodiment of an adjustable holding frame 308 stretched along the Y-axis 209 to a preset lockable position 311 wherein the extension rod 310 locks it in place. Specifically, the PVA film is stretched here along the Y axis until the PVA film is 0.05 mm-0.01 mm in thickness. The PVA film, once stretched in its X-axis and its Y-axis, it becomes a functional retarder film. The retarder film, remaining in proper temperature and moisture during the processing phase, is stabilized between lower frame plate and upper frame, which are held together with frame hinges 207. Additional clips can be used to help prevent retarder film from shrinking during shaping.

Figure 4A:
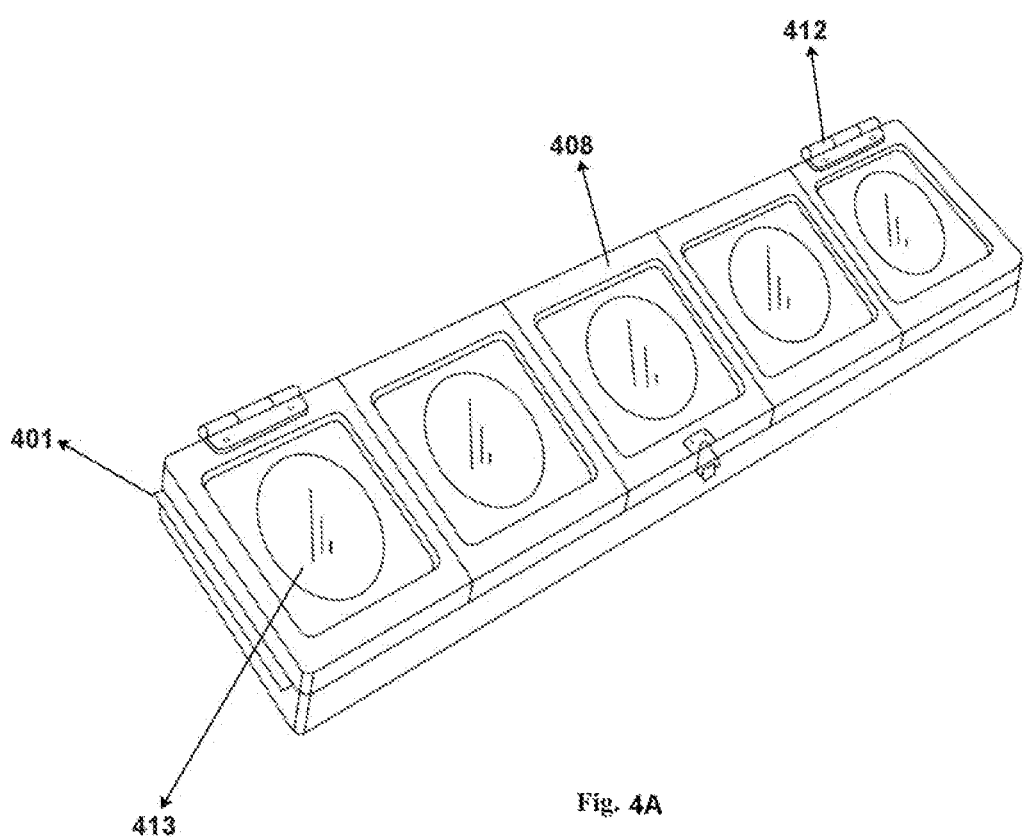
FIG. 4A depicts an embodiment of the multiple frame holder.
Figure 4B:
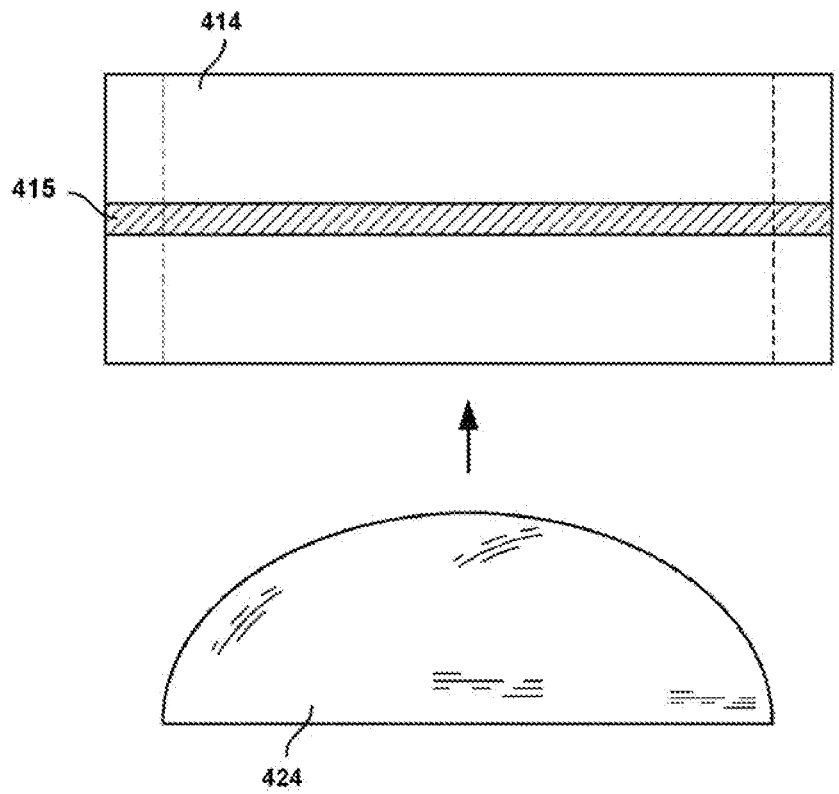
FIG. 4B depicts an embodiment of the multiple frame holder.
Figure 4B:
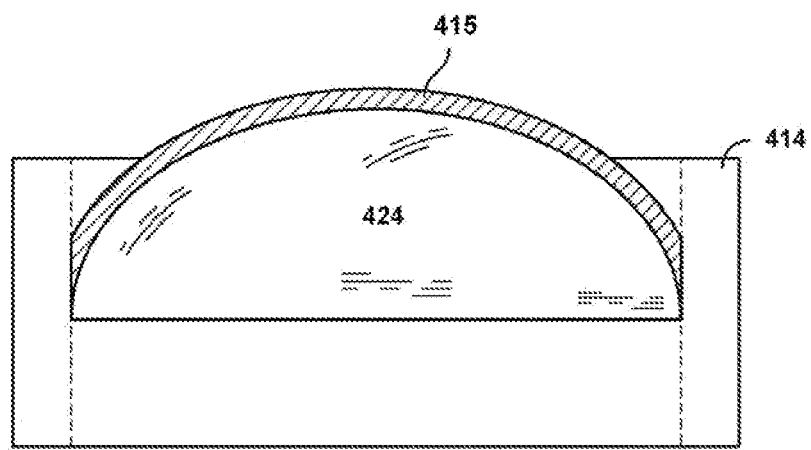

FIG. 4A depicts one embodiment of the retarder film 401 being formed into a multiple holding frame 408 to form into a curved or flat or any desired shape comprising the steps of:

a. stabilize and place retarder film 401 onto the multiple holding frames 408 using multiple holding frame hinges 412;

b. specifically, mounting the retarder film 401 onto the multiple holding frame 408 wherein the multiple holding frame 408 is comprised of an upper frame and a lower frame wherein the upper frame closes onto the lower frame whereby securing the retarder film 401 from shrinking;

c. next press a convex mold 424 (FIG. 4B) onto retarder film 415 (FIG. 4B) to force the retarder film 412 (FIG. 4B) into the desired curved shape through the oval openings 413 (FIG. 4A) of multiple frame holder 414 (FIG. 4B);

d. heat the retarder film at 60° C. to 80° C. until its moisture content is about 50%;

e. inspect and mark the molecule direction of the retarder film 415 (FIG. 4B); and f. dry the retarder film 415 (FIG. 4B) at approximately 25° C. and 40-50% humidity until its moisture content is about 40%.

Next, (referring back to FIG. 4A) retarder film is cut and removed from the multiple holding frame 408. As described earlier, multiple holding frame 408 has an opening 413 in the center, which allows convex mold to be pushed through multiple holding frame 408 and against the retarder film 401. One side of convex mold is used to shape the retarder film 401. The convex surface of convex mold is pushed into the flat piece of soft retarder film to bend it into the desired shape, curve or arc.

Since retarder film is soft and wet, it will conform to its shape to the mold. In one embodiment, convex mold is made of glass, such as glass in common practice for forming thermosetting resin ophthalmic lenses, or another material that is relatively transparent or semi-transparent polymer, so that the epoxy can be cured by UV light which passes through the mold. In other embodiments, convex mold is made of a material which conducts heat, so that heat can pass through the mold. Once arc is formed, retarder film is next heated at about 80° C. or less to remove the moisture in the retarder film without melting it. This should take about 10 minutes. Retarder film is relatively soft because it was "wet" due to its moisture content made, and once it becomes "dry" due to the reduction in moisture content, it will fix or lock in its shape. It is noted that temperatures above 80° C. may melt or liquefy the retarder film.

Next, retarder film is inspected in a quality control stage after the initial drying for air bubbles, dirt, color evenness, tears, etc. The dioptre and other optical properties of the retarder film can be measured. If all is approved, the lens is marked with a molecule direction. After marking, the retarder film can then be removed to a clean room at room temperature and low humidity levels for further cooling. This produces a curved, dry retarder film that adheres better to epoxy, which eventually becomes part of the 3-D stereoscopic viewing lens.

EXAMPLE TWO

III. Preparation of Polymer Film for Use to Form Retarder Film

Figure 11:
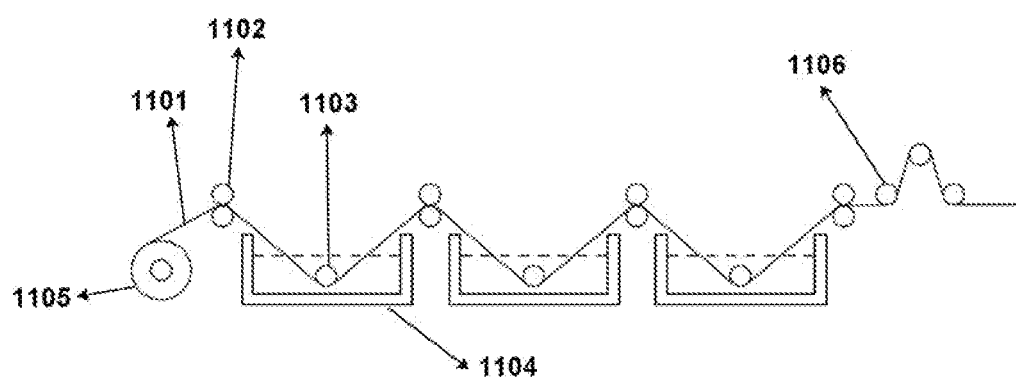
FIG. 11 depicts another embodiment of stretching of the retarder film.

FIG. 11 depicts one embodiment of an assembly line to prepare a retarder film. Polymer film can be polymer Polyurethane (PU), Polyvinyl chloride (PVC), Polypropylene (PP), Polycarbonate (PC), Polyester (PE), (CAB) Cellulose Acetate Butyrate, (CP) Cellulose Acetate Propionate, (DAC) Cellulose Diacetate and (TAC) Triacetate Cellulose film. Specifically, FIG. 11 depicts the process of continuous stretch of the polymer film along the X-axis. Starting with an untreated roll of polymer film, without directional molecular arrangement. Using rollers to stretch and transport polymer film from one or more stages as follows:

d. mount an untreated roll of polymer film 1101 at the beginning of assembly line 1105;

e. heat the polymer film to temperature over 90° C.-120° C. wherein said film becomes malleable;

f. stretching the film as the film 1101 continues to be stretched through roller 1102, roller 1103 and roller 1106.

Polymer film is stretched to about 3 to 6 times its original size along the x-axis, combining stretch, its width is reduced to about one half of its original widths, and its thickness is reduced to 0.12-0.02 mm thick. The molecules of the polymer film will become more evenly aligned.

Figure 12:
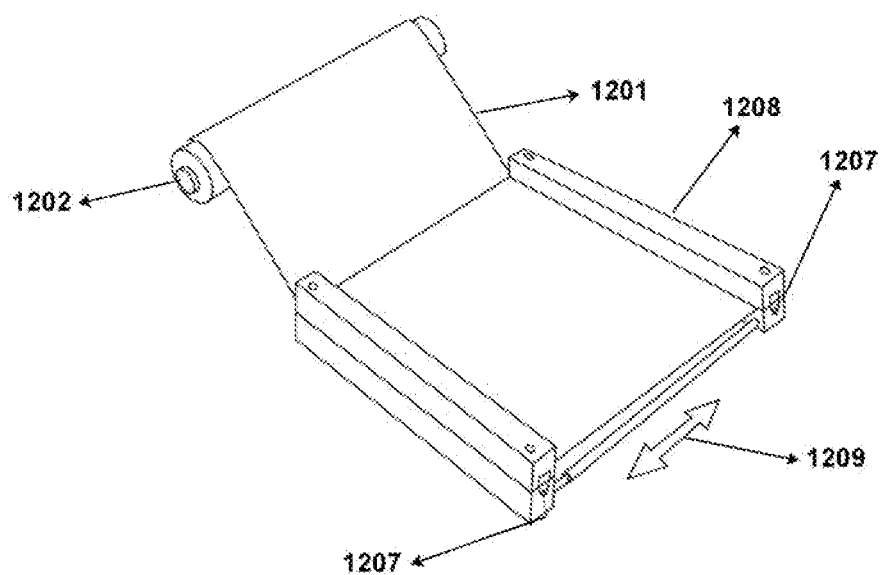
FIG. 12 depicts an embodiment of the adjustable width holding frame.
Figure 13:
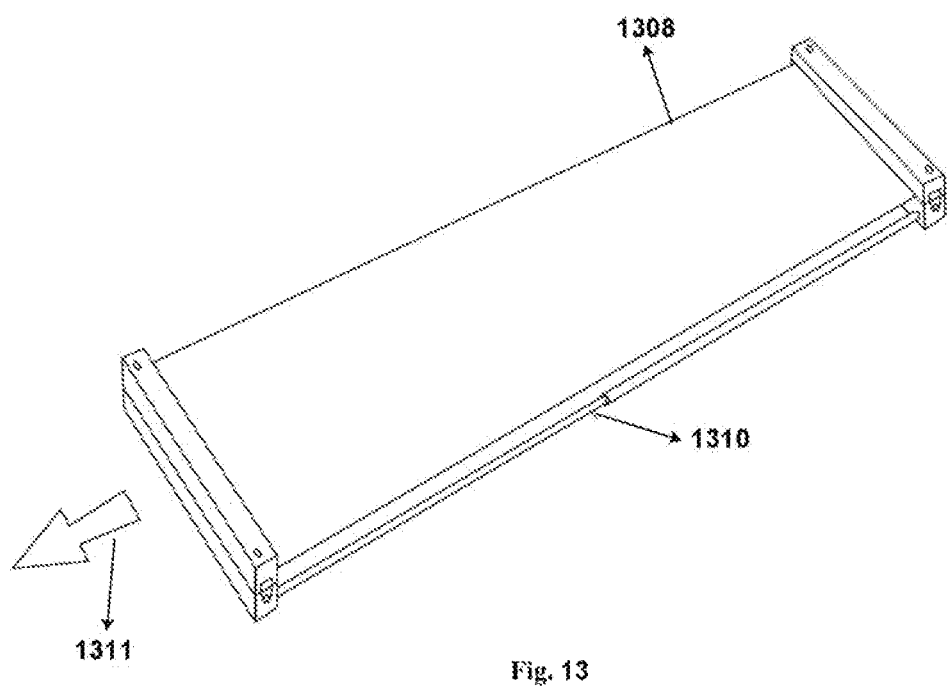
FIG. 13 depicts an embodiment of an adjustable holding frame.

IV. Forming the Retarder Film of Example Two and Forming it into the Desired Curved Shape Using a Convex Mold FIG. 12 and FIG. 13 depict one embodiment of a manual and semi-automatic or automatic adjustable clamping frame used for the next step of transforming the polymer film into a retarder film. Specifically, after steps performed in FIG. 11, FIG. 12 depicts one embodiment of a width-adjustable holding frame 1208 to hold the polymer film along the Y-axis 1209 using a top and bottom clamping frames together with hinges 1207; FIG. 3 depicts one embodiment of an adjustable holding frame 1308 stretched along the Y-axis 1209 to a preset lockable position 1311 wherein the extension rod 1310 locks it in place. Specifically, the polymer film is stretched here along the Y axis until the PVA film is 0.05 mm-0.01 mm in thickness. The polymer film, once stretched in its X-axis and its Y-axis, it becomes a functional retarder film. After stretching is done, use the spectrum measure machine and reflection index data to adjust the stretch machine to what is desired.

The retarder film, remaining in proper temperature during the processing phase, is stabilized between lower frame plate and upper frame, which are held together with frame hinges 1207. Additional clips can be used to help prevent retarder film from shrinking during shaping.

Figure 14A:
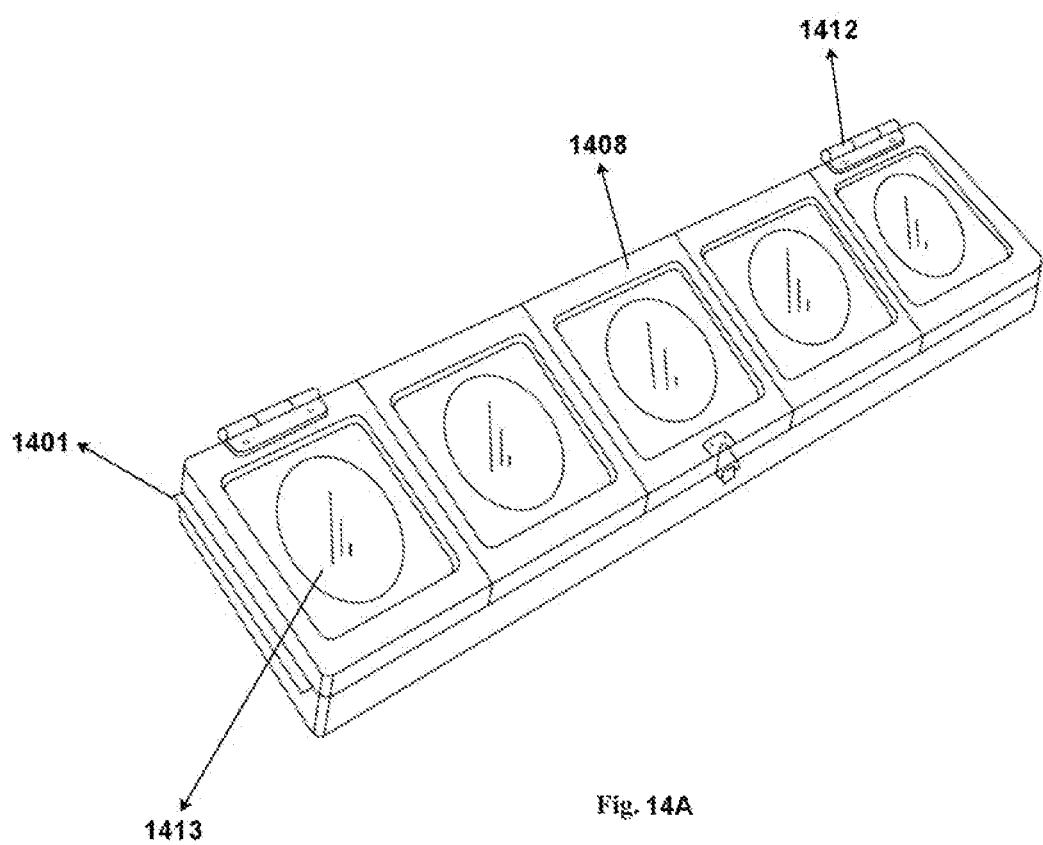
FIG. 14A depicts an embodiment of the multiple frame holder.
Figure 14B:
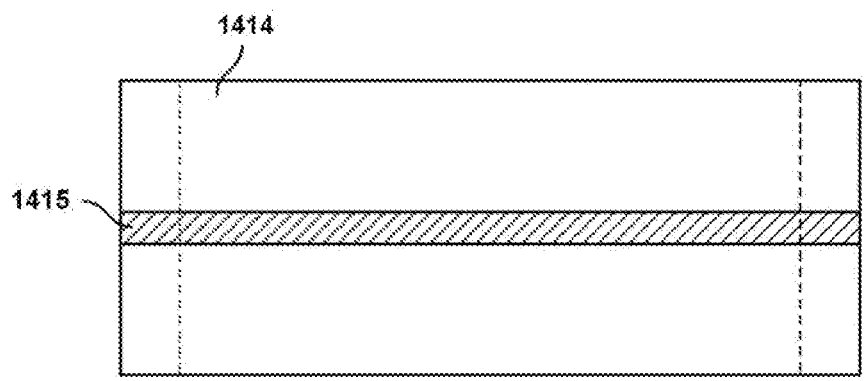
FIG. 14B depicts an embodiment of the multiple frame holder.
Figure 14B:
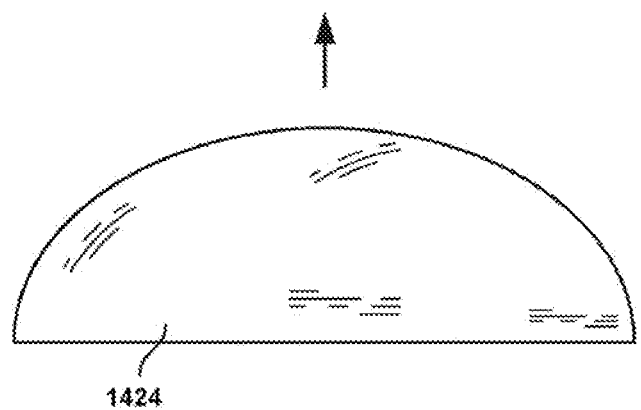
Figure 14B:
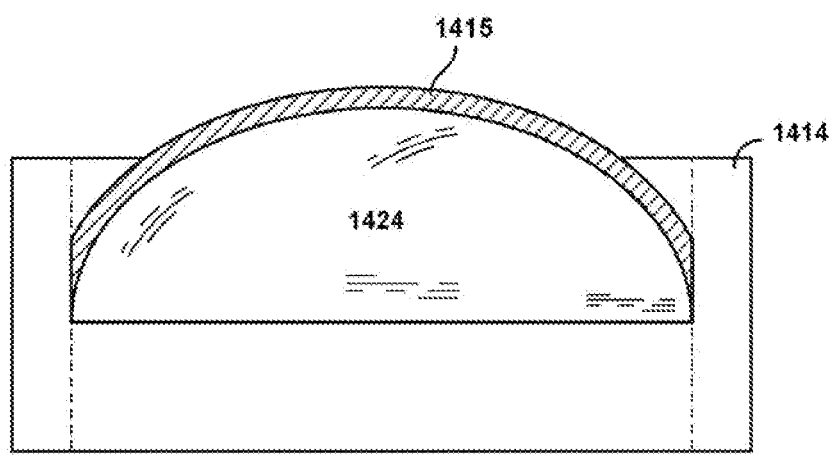

FIG. 14A depicts one embodiment of the retarder film 1401 being formed into a multiple holding frame 1408 to form into a curved or flat or any desired shape comprising the steps of:

g. stabilize and place retarder film 1401 onto the multiple holding frames 1408 using multiple holding frame hinges 1412;

h. next press a convex mold 1424 (FIG. 14B) onto retarder film 1415 (FIG. 14B) to force the retarder film 1415 (FIG. 14B) into the desired curved shape through the oval openings 1413 (FIG. 14A) of multiple frame holder 1414 (FIG. 14B);

i. inspect and mark the molecule direction of the retarder film 1415 (FIG. 14B); and Next, (referring back to FIG. 14A) retarder film is cut and removed from the multiple holding frame 1408. As described earlier, multiple holding frame 1408 has an opening 1413 in the center, which allows convex mold to be pushed through multiple holding frame 1408 and against the retarder film 1401. One side of convex mold is used to shape the retarder film 1401. The convex surface of convex mold is pushed into the flat piece of soft retarder film to bend it into the desired shape, curve or arc.

Figure 5A:
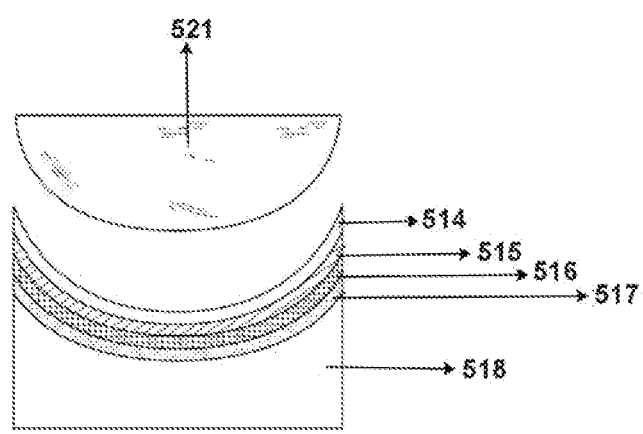
FIG. 5A depicts an embodiment of a 3-D lens.
Figure 5B:
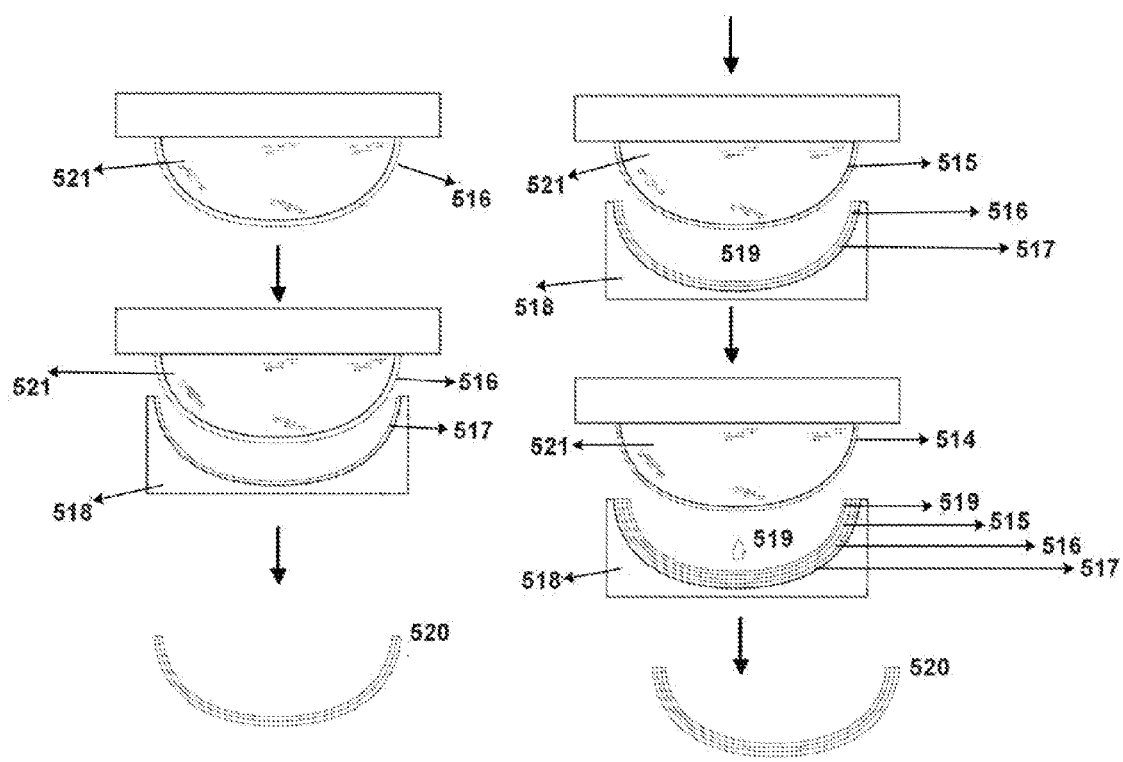
FIG. 5B depicts an embodiment of a 3-D lens.
Figure 6:
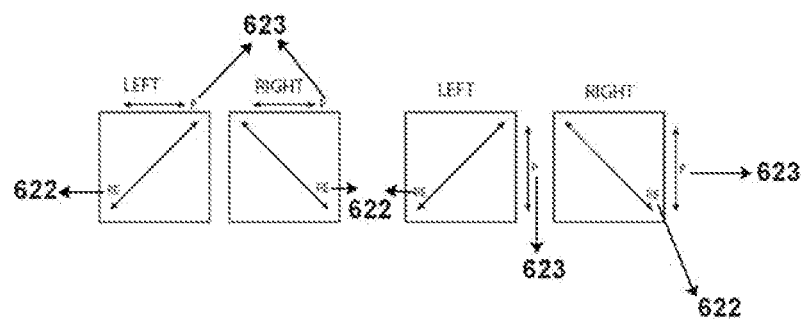
FIG. 6 depicts an embodiment of how a retarder film is aligned against a linear polarized film.

V. Addition of Hard Epoxy to the Outer, Convex Side of the Retarder Film of Example One and Example Two FIG. 5A depicts one embodiment of an overview of a 3-D stereoscopic viewing lens comprising a convex mold 521, a concave mold 518 holding epoxy layer 517, retarder film 516, linear polarized film 515 and lens substrate 514. Depicted in FIG. 5B (from the left column down and up and through the right column), the steps are as follows:

a. polish and clean the surface of concave mold 518;

b. add about 5 cc of hard epoxy 517 in liquid form onto concave mold 518; and c. position concave mold 518 and convex mold 521 together so that the outer surface of retarder film 516 is pressed down onto epoxy liquid 517;

d. compress molds together;
e. apply UV treatment 520;
f. apply linear polarized film 515 on the convex mold 518;
g. add UV glue 519 on the top of the retarder film 516;
h. press convex mold 521 having linear polarized film 515 on to the UV glue 519
i. adding UV dry treatment 520;
j. here a "3-D circular polarized function card" is formed;
k. add UV glue 519 on top of polarized function card;
l. affixing lens substrate comprised of AC, CR, PU, TAC, or GLASS materials 514 on to convex mold;
m. compress molds together; when laminating the retarder 516 and linear polarized 519, paying careful attention that the angle is correct at +45 degrees and −45 degrees as disclosed in FIG. 6 where the retarder 622 is positioned against linear polarized film 623 at a −45 degree and at a −45 degree; differences within 5 degrees still can be acceptable.
n. determine direction of polarization; and
o. apply UV treatment 520

The lens' convex and concave mold can be made of transparent glass. About 5 cc of hard epoxy 517 is used, which should spread out to form a layer about 0.1 mm-0.5 mm thick, preferably 0.2 mm-0.3 mm for good surface tension. This eventually becomes layer of hard epoxy in lens. Epoxy liquid should be heated to about 80° C. to 90° C. so that they will be liquid or semi-liquid, to help eliminate bubbles. The liquid epoxy is soft enough to flow, but it is not so viscous that it will flow away without adhering. The liquid epoxy 517 can be dripped onto the concave mold 518, smoothly expanding from the center in a circular motion to evenly spread the epoxy 517 to help remove air bubbles. This process can be performed in an environment at approximately room temperature.

In one embodiment, holding frame holding retarder film 516 in contact with convex mold 521, and the convex mold 521-plus-retarder film 516 combination is inverted and placed on top of concave mold 518 and attached together. Because the final layer of hard epoxy 517 is less than 0.5 mm, no gasket is needed. During UV treatment 520, the liquid epoxy 517 is cured and made hard using ultraviolet light, heat, radiation, pressure, passage of time, or other methods for treatment epoxy.

Figure 7A:
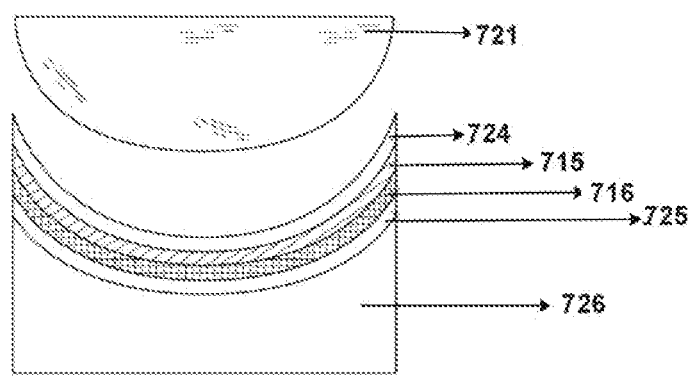
FIG. 7A depicts an embodiment of a 3-D lens.
Figure 7B:
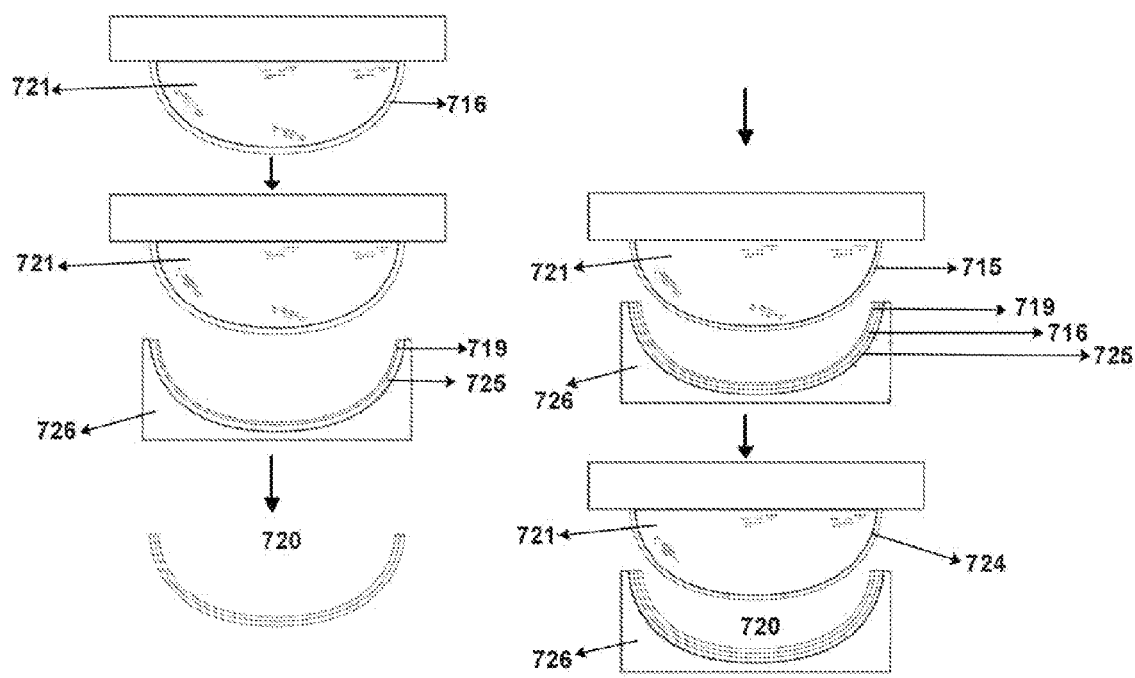
FIG. 7B depicts an embodiment of a 3-D lens.

FIG. 7A depicts one embodiment of an overview of 3D Stereoscopic view lens comprising a convex mold 721, a concave mold 726, lens substrate layer 724 and glass lens 725, retarder film 716, linear polarized film 715. Depicted in FIG. 7B (from the left column down and up and through the right column), the steps are as follows:
a. polish and clean the surface of concave mold 726;
b. add about 5 cc of glass substrate 725 onto concave mold 726, which creates the convex side of the lens; and
c. position concave mold 726 and convex mold 721 together so that the outer surface of retarder film 716 can be pressed down onto glass layer 725;
d. affix retarder 716 to convex mold 721;
e. apply glue 719 to the glass substrate layer 725
f. compress molds together;
g. determine direction of the retarder 716; and
h. dried with air or UV light 720;
i. affix linear polarized film 715 on the convex mold 721;
j. add UV glue 719 on the concave side of the retarder 716;
k. compress molds together; when laminating the retarder 716 and linear polarized film 715, paying careful attention that the angle is correct at +45 degrees and −45 degrees, but not limited to any other combination of desired degree.
l. determine direction of polarization; and
m. dried with air or UV light 720
n. remove convex mold 721 from concave mold 726
o. add lens substrate (AC, CR, PU, TAC, or GLASS) 724 to convex mold 721 and compress molds together to form a 3-D stereoscopic viewing lens.

The retarder-plus-glass collection is then sent to an assembly line with UV treatment equipment to be hardened for about three minutes. Fine shaping can also be performed manually at this stage by cutting away excess retarder. This produces a retarder film with a hard layer of glass on its outer, convex surface. In another embodiment, this produces a polarized wafer coated with glass on both sides. The uncoated concave side, the glass-lined convex side, or both sides could then be combined with a base material, through casting in a gasket mold, injection molding, or other methods for combining lens components.

Lens substrate can be GLASS, acrylic (AC), polyurethane (PU), triacetate (TAC), casting resin (CR), cellulose acetate (CAB), cellulose propionate (CP), or NYLON; substrate can have one side or two sides' coatings. Linear polarized film also includes partially circular polarized film.

Figure 8:
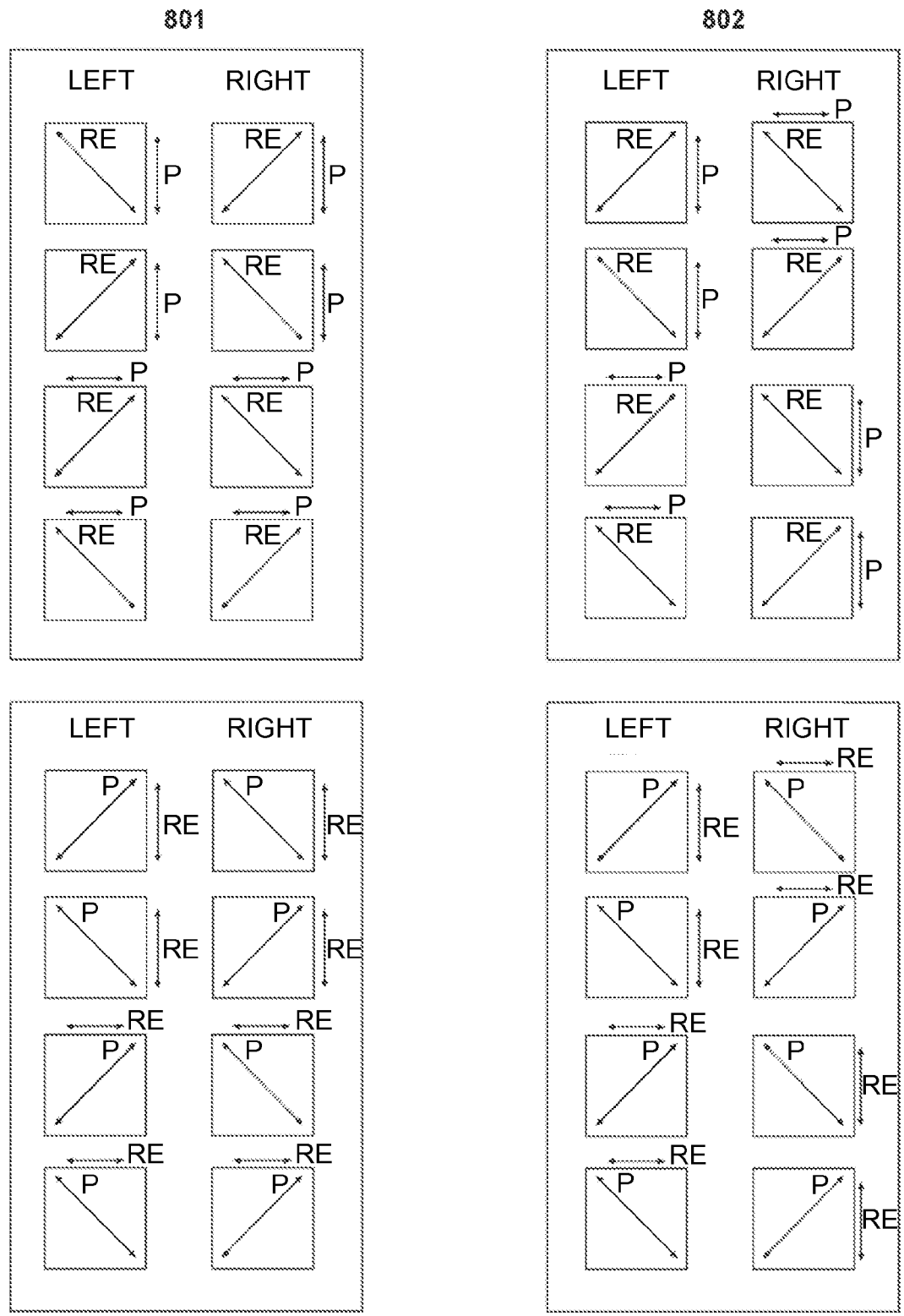
FIG. 8 depicts variations of how a retarder film is aligned against a linear polarized film.

FIG. 8 depicts the combinations of lens inserts to right side and left side depending on the direction of TV and projector. Although the present invention has been described by way of example with references to the drawings, it is to be noted herein that various changes and modifications, including performing steps in different orders, will be apparent to those skilled in the art. Therefore, unless such changes and modifications depart from the scope of the present invention, they should be construed as being included therein.

EXAMPLE THREE

I. Utilizing PVA Film and Linear Polarized Film for LCD Use

Figure 9A:
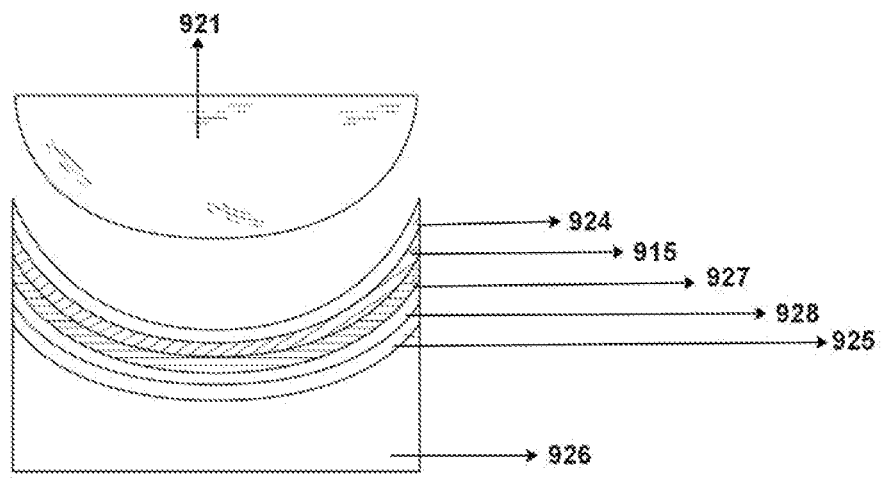
FIG. 9A depicts an embodiment of a 3-D lens.
Figure 9B:
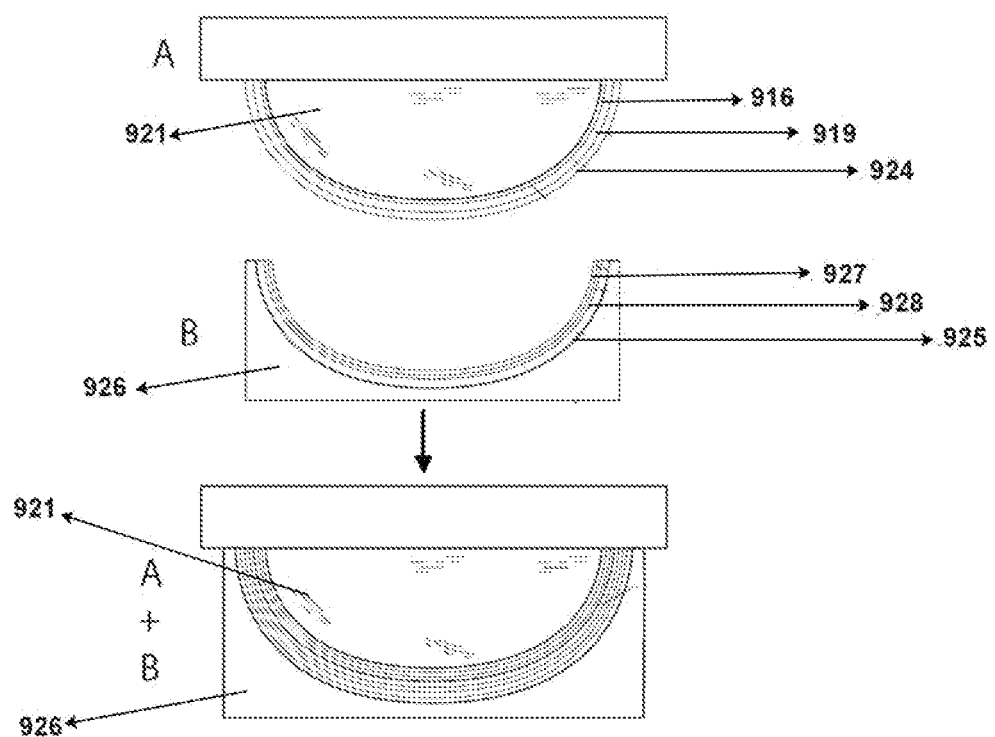
FIG. 9B depicts an embodiment of a 3-D lens.

FIG. 9A depicts one embodiment of an overview of utilizing PVA film as retarder film, using the methods depicted above, for LCD use comprising a convex mold 921, a concave mold 926, lens substrate layer 924 and glass lens 925, ITO layer 928, LCD layer 927, retarder film 915. Depicted in FIG. 9B, the steps are as follows:
a. add lens substrate 925 onto the exposed, concave 926 (top flat) side of the mold;
b. vacuum coated with ITO (electrode conductor) 928 to form the direction in LCD;
c. add liquid crystal display layer (LCD) 927 to concave mold 926;
d. place convex mold 921 on top; having a lens substrate layer 916 adjoined with UV glue 919 to retarder film 924 so that the concave 926 having LCD 927 surface presses against retarder film 924; by paying careful attention that the angle is correct at +45 degrees and −45 degrees;
e. Applying UV treatment.

Figure 10:
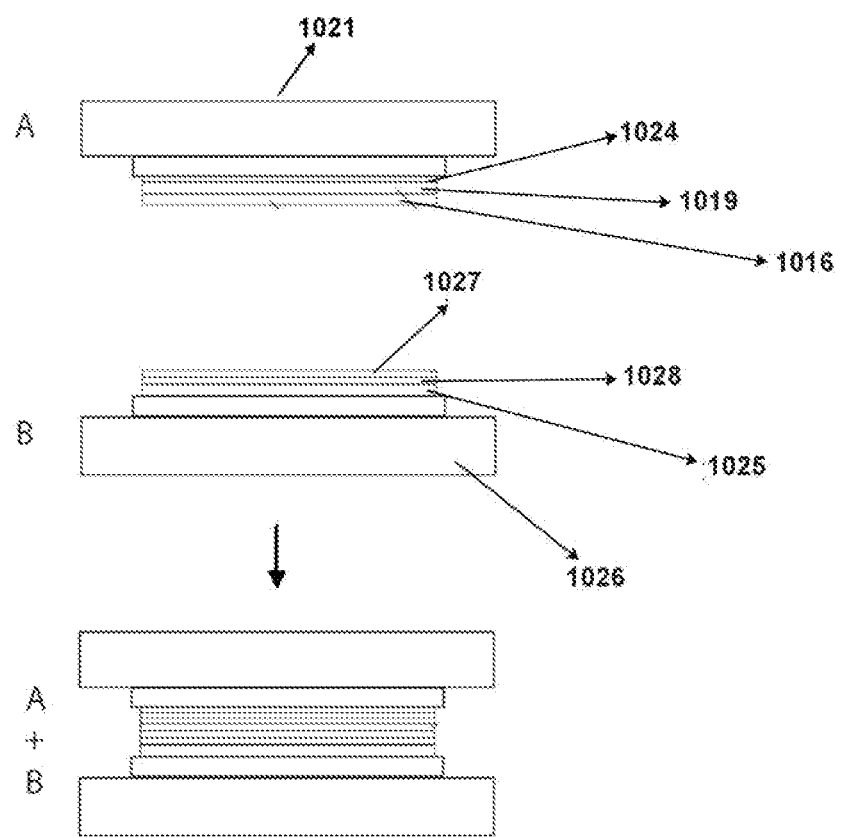
FIG. 10 depicts an embodiment of a 3-D lens.

The same method can be applied on flat surface as depicts in FIG. 10
a. add lens substrate 1025 onto the exposed, bottom flat 1026 side of the mold;
b. vacuum coated with ITO (electrode conductor) 1028 to form the direction in LCD 1027;
c. add liquid crystal display (LCD) 1027 to bottom flat mold 1026;
d. affixing retarder 1016 with substrate 1024 with glue 1019 to top flat 1024;
e. place top flat 1021 on top; having a lens substrate layer 1024 adjoined with UV glue 1019 to retarder film 1016 so that the bottom flat 1026 having LCD 1027 surface presses against retarder film 1016; by paying careful attention that the angle is correct at +45 degrees and −45 degrees;
f. apply UV treatment.

What is claimed is:

1. A Method of making a 3-D stereoscopic viewing lens comprising the following steps:
   a. mounting a PVA film to an assembly line;
   b. wetting, cleaning, and washing said PVA film through said assembly line;
   c. softening, expanding and stretching said PVA film's x-axis through said assembly line;
   d. adding gap filling agent to said PVA film;
   e. stretching said PVA film's y-axis through a width frame holder whereby transforming said PVA film into a retarder film;
   f. mounting said retarder film onto a multiple holding frame;
   g. pressing a convex mold onto said retarder film to force said retarder film into a desired curved shape through one or more openings of said multiple holding frame;
   h. heating said retarder film to reduce said retarder film's moisture content;
   i. drying said retarder film;
   j. preparing a concave mold and a second convex mold;
   k. adding epoxy onto said concave mold;
   l. affixing said retarder film onto said second convex mold;
   m. positioning said retarder film with said second convex mold wherein said retarder film with said second convex mold is pressed down onto said epoxy with said concave mold;
   n. compressing said second convex mold with said concave mold;
   o. applying UV treatment to said second convex mold and said concave mold;
   p. opening said second convex mold and said concave mold;
   q. affixing a linear polarized film to said second convex mold;
   r. adding UV glue to said retarder film;
   s. pressing said second convex mold having said linear polarized film to said concave mold having said retarder film with UV glue;
   t. applying UV dry treatment to said concave mold and said second convex mold whereby said retarder film laminates with said linear polarized film to form circular polarized film;
   u. removing said second convex mold from said concave mold;
   v. applying UV glue to said circular polarized film;
   w. affixing a lens substrate to said second convex mold;
   x. compressing said second convex mold having said lens substrate with said concave mold having said circular polarized film to form a 3-D stereoscopic viewing lens;
   y. applying UV treatment to said second convex mold and said concave mold;
   z. removing said 3-D stereoscopic viewing lens from said second convex mold and said concave mold.

2. The method claim of 1 wherein water is used in said wetting, cleaning and washing.

3. The method claim of 1 wherein said processing of wetting, cleaning and washing is continued until said PVA film reaches approximately 70%-85% water saturation.

4. The method claim of 1 wherein said softening, expanding and stretching is carried out by one or more rollers mounted in said assembly line.

5. The method claim of 1 wherein said gap filling agent is comprised of potassium iodide, sodium iodide, copper (I) iodide, boric acid, and sodium tetra borate decahedra.

6. The method claim of 1 wherein said gap filling agent is added during said softening, expanding and stretching said PVA film.

7. The method claim of 1 wherein said retarder film is stretched to about 3 to 6 times its original size along its x-axis.

8. The method claim of 1 wherein said retarder film's width is reduced to about one half of its original width.

9. The method claim of 1 wherein said retarder film's thickness is reduced to 0.02-0.12 mm thick.

10. The method claim of 1 wherein said heating is continued until said retarder film's moisture content is reduced to about 50%.

11. The method claim of 1 wherein said drying takes place in a environment at approximately 25° C. and at 40-50% humidity until said PVA film's moisture content is reduced to about 40%.

12. The method claim of 1 wherein said epoxy is in liquid form.

13. The method claim of 1 wherein said laminating process is further comprised of laminating said retarder film against said linear polarized film in a +45 degrees and −45 degrees configuration.

* * * * *